United States Patent
Okuda et al.

(10) Patent No.: US 9,641,765 B2
(45) Date of Patent: May 2, 2017

(54) IMAGE CAPTURE DEVICE, IMAGE CORRECTION METHOD, AND IMAGE CORRECTION PROGRAM

(71) Applicant: NEC Corporation, Tokyo (JP)

(72) Inventors: Yuhi Okuda, Tokyo (JP); Akihiko Iketani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/786,270

(22) PCT Filed: Apr. 15, 2014

(86) PCT No.: PCT/JP2014/002118
§ 371 (c)(1),
(2) Date: Feb. 23, 2016

(87) PCT Pub. No.: WO2014/174794
PCT Pub. Date: Oct. 30, 2014

(65) Prior Publication Data
US 2016/0198075 A1   Jul. 7, 2016

(30) Foreign Application Priority Data
Apr. 23, 2013 (JP) ................................ 2013-090532

(51) Int. Cl.
*H04N 5/235* (2006.01)
*H04N 5/33* (2006.01)
(Continued)

(52) U.S. Cl.
CPC ............. *H04N 5/2351* (2013.01); *G03B 5/00* (2013.01); *H04N 5/2254* (2013.01);
(Continued)

(58) Field of Classification Search
CPC .. H04N 5/2351; H04N 5/365; H04N 5/23212; H04N 5/232; G03B 2205/0015
See application file for complete search history.

(56) References Cited

U.S. PATENT DOCUMENTS 4,762,985 A * 8/1988 Imai ....................... G03B 27/34
250/201.4
6,034,794 A * 3/2000 Suganuma ............. H04N 1/401
358/518
(Continued)

FOREIGN PATENT DOCUMENTS

| JP | 2001-86411 | 3/2001 |
|---|---|---|
| JP | 2007-266787 | 10/2007 |
| JP | 2009-207072 | 9/2009 |

OTHER PUBLICATIONS

International Search Report and Written Opinion mailed May 13, 2014 in corresponding PCT International Application.
(Continued)

*Primary Examiner* — Ahmed A Berhan
(74) *Attorney, Agent, or Firm* — Finnegan, Henderson, Farabow, Garret & Dunner LLP

(57) ABSTRACT

The image capture device includes an image capture element which is formed of a plurality of pixels and acquires a captured image by detecting light from a subject and converting the light into an electric signal, an optical path changing unit which changes an optical path of light incident on an image capture element and displaces a position of light incident on the image capture element, a state change determining unit which obtains a deviation of a brightness value per pixel in a captured image, determines whether or not a subject temporally changes its state based on the deviation, and outputs an optical path change instruction to an optical path changing unit when it is determined that the subject does not change its state, a correction value calcu-
(Continued)

lating unit which performs a predetermined correction value calculating process on captured images of the same subject before and after a state change by an image capture element and calculates a noise image contained in the captured image as a correction value, and a correction executing unit which eliminates noise from a captured image by use of a correction value.

10 Claims, 13 Drawing Sheets

(51) Int. Cl.
    *H04N 5/232*      (2006.01)
    *H04N 5/349*      (2011.01)
    *H04N 5/225*      (2006.01)
    *G03B 5/00*      (2006.01)
    *H04N 5/357*      (2011.01)

(52) U.S. Cl.
CPC ..... *H04N 5/23254* (2013.01); *H04N 5/23287* (2013.01); *H04N 5/33* (2013.01); *H04N 5/349* (2013.01); *H04N 5/3572* (2013.01)

(56) References Cited

U.S. PATENT DOCUMENTS

| | | | |
|---|---|---|---|
| 7,903,168 B2* | 3/2011 | Pillman | H04N 5/23212 348/345 |
| 7,991,280 B2 | 8/2011 | Ogino | |
| 2011/0001830 A1* | 1/2011 | Egashira | G01J 5/08 348/164 |
| 2012/0081566 A1 | 4/2012 | Côté et al. | |

OTHER PUBLICATIONS

Extended European Search Report mailed Nov. 8, 2016, by the European Patent Office in counterpart European Patent Application No. 14787825.0.

* cited by examiner

IMAGE CAPTURE DEVICE, IMAGE CORRECTION METHOD, AND IMAGE CORRECTION PROGRAM

CROSS-REFERENCE TO RELATED PATENT APPLICATIONS

This application is a National Stage Entry of International Application No. PCT/JP2014/002118, filed Apr. 15, 2014, which claims priority from Japanese Patent Application No. 2013-090532, filed Apr. 23, 2013. The entire contents of the above-referenced applications are expressly incorporated herein by reference.

TECHNICAL FIELD

The present invention relates to an image capture device, an image correction method, and an image correction program.

BACKGROUND ART

Today, an infrared image capture device is used in various fields. This type of image capture device includes an image capture element and acquires a subject image by photo-electrically converting infrared rays emitted from a subject with the image capture element.

In general, an image capture element is formed of a plurality of pixels and there are individual differences between respective pixels. Further, each pixel outputs inherent noise. In other words, a mixed signal formed of a signal that can be acquired by photo-electrical conversion and a noise signal is output from each pixel. Therefore, a captured image includes a noise image based on an individual difference of a pixel superimposed on an image of a subject only. Thus, it is required to obtain a true subject image by eliminating noise from a captured image.

For example, Japanese Unexamined Patent Application Publication No. 2009-207072 discloses an infrared image capture device that eliminates noise (fixed-pattern noise) per pixel by use of an SbNUC (Scene-based Nonuniformity Correction) correction method or an SbFPN (Scene-based Fixed Pattern Noise) correction method.

CITATION LIST

Patent Literature

[PTL 1] Japanese Unexamined Patent Application Publication No. 2009-207072

DISCLOSURE OF INVENTION

Technical Problem

However, there is a problem in Japanese Unexamined Patent Application Publication No. 2009-207072 that, when a subject does not change a state thereof, noise elimination cannot be performed because a correction method such as SbNUC cannot be applied.

A main objective of the present invention is to provide an image capture device, an image correction method, and an image correction program that determine a state change of a subject and enable noise elimination regardless of whether or not a state change exists.

Solution to Problem

In order to solve the aforementioned problem, an image capture device of the invention which captures an image of a subject and outputs an image capture signal includes an image capture element that is formed of a plurality of pixels and acquires a captured image by detecting light from a subject and converting the light into an electrical signal, an optical path changing unit that changes an optical path of light incident on an image capture element and displaces a position of light incident on the image capture element, a state change determining unit that obtains a deviation of a brightness value per pixel in a captured image, determines whether or not a subject temporally changes a state thereof based on the deviation, and outputs an optical path change instruction to an optical path changing unit when it is determined that the subject does not change a state thereof, a correction value calculating unit that performs a predetermined correction value calculating process on captured images of a same subject before and after a state change by an image capture element and calculates a noise image contained in the captured images as a correction value, and a correction executing unit that eliminates noise from a captured image by use of a correction value.

Further, an image correction method of the invention for eliminating noise from a captured image of a subject includes an image capturing procedure of causing an image capture element formed of a plurality of pixels to acquire a captured image by detecting light from a subject and converting the light into an electrical signal, an optical path changing procedure of changing an optical path of light incident on an image capture element and displacing a position of light incident on the image capture element, a state change determining procedure of obtaining a deviation of a brightness value per pixel in a captured image, determining whether or not a subject temporally changes a state thereof based on the deviation, and outputting an optical path change instruction to an optical path changing procedure when it is determined that the subject does not change a state thereof, a correction value calculating procedure of performing a predetermined correction value calculating process on captured images of a same subject before and after a state change by an image capture element and calculating a noise image contained in the captured images as a correction value, and a correction executing procedure of eliminating noise from a captured image by use of a correction value.

Further, an image correction program of the invention for performing image correction to eliminate noise from a captured image of a subject includes an image capturing step of causing an image capture element formed of a plurality of pixels to acquire a captured image by detecting light from a subject and converting the light into an electrical signal, an optical path changing step of changing an optical path of light incident on an image capture element and displacing a position of light incident on the image capture element, a state change determining step of obtaining a deviation of a brightness value per pixel in a captured image, determining whether or not a subject temporally changes a state thereof based on the deviation, and outputting an optical path change instruction to an optical path changing step when it is determined that the subject does not change a state thereof, a correction value calculating step of performing a predetermined correction value calculating process on captured images of a same subject before and after a state change by an image capture element and calculating a noise image contained in the captured image as a correction value, and a correction executing step of eliminating noise from a captured image by use of a correction value.

Advantageous Effects of Invention

The present invention determines a state change of a subject and performs a noise elimination process corresponding to whether or not a state change exists so that a high-quality image can be obtained regardless of whether or not a state change exists.

DESCRIPTION OF EMBODIMENTS

Figure 1:
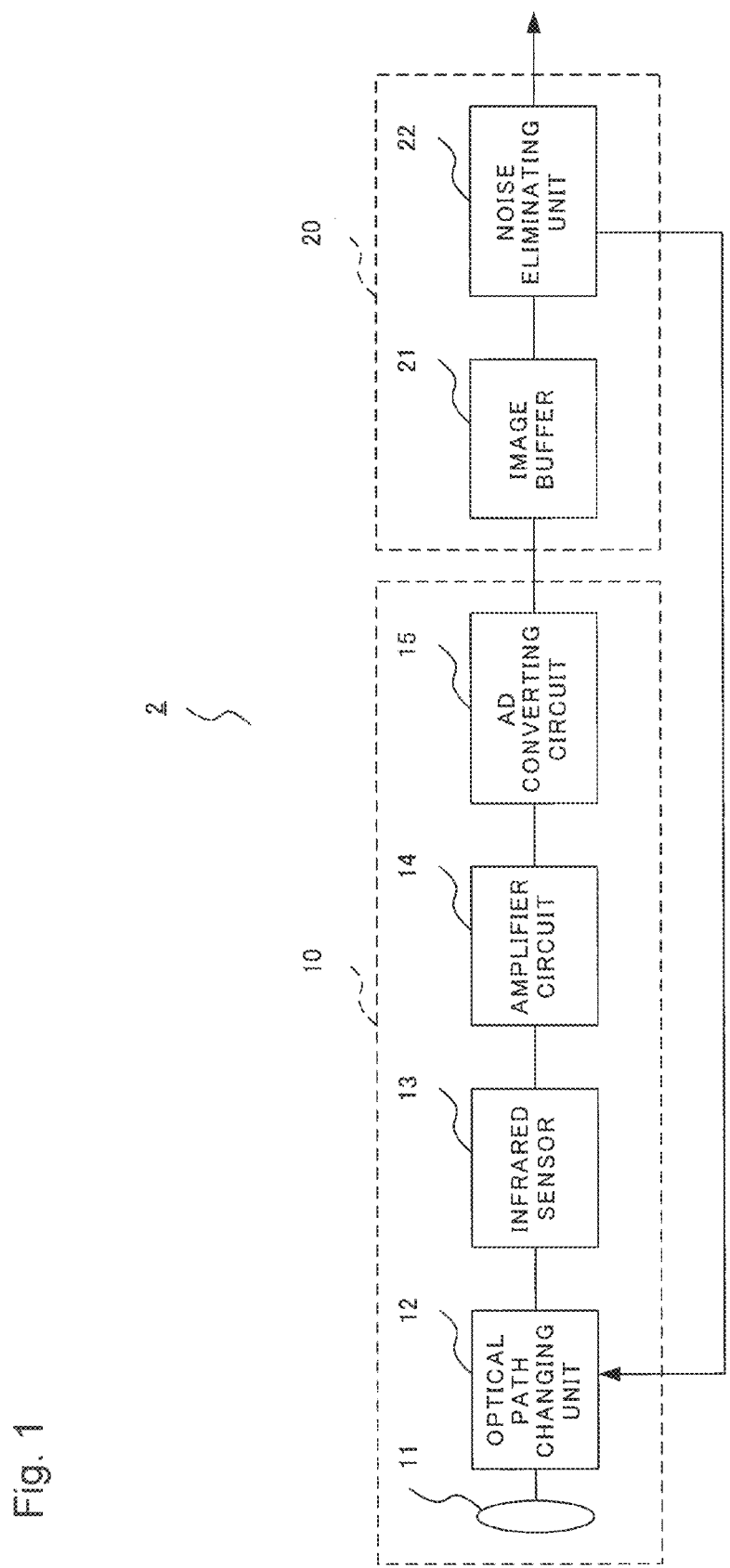
FIG. 1 is a block diagram of an image capture device according to an exemplary embodiment.

An exemplary embodiment of the present invention will be described. FIG. 1 is a block diagram of an image capture device 2 according to the present exemplary embodiment. As main components, the image capture device 2 includes an image capturing block 10 that captures an image of a subject and outputs an image capture signal, and a noise eliminating block 20 that performs a predetermined noise elimination process on an image capture signal. An image formed by an image capture signal is hereinafter described as a captured image.

Although it is described that infrared rays are used as light to be detected and an infrared sensor is used as an image capture element in the present exemplary embodiment, the light and the image capture element are not limited to infrared rays and an infrared sensor, respectively.

The image capturing block 10 includes a lens 11, an optical path changing unit 12, an infrared sensor 13, an amplifier circuit 14, and an AD converting circuit 15.

The lens 11 focuses infrared rays from a subject. The optical path changing unit 12 is provided between the lens 11 and the infrared sensor 13, and changes an optical path of infrared rays (refracts infrared rays) from the lens 11 to make the rays incident on the infrared sensor 13.

Figure 2:
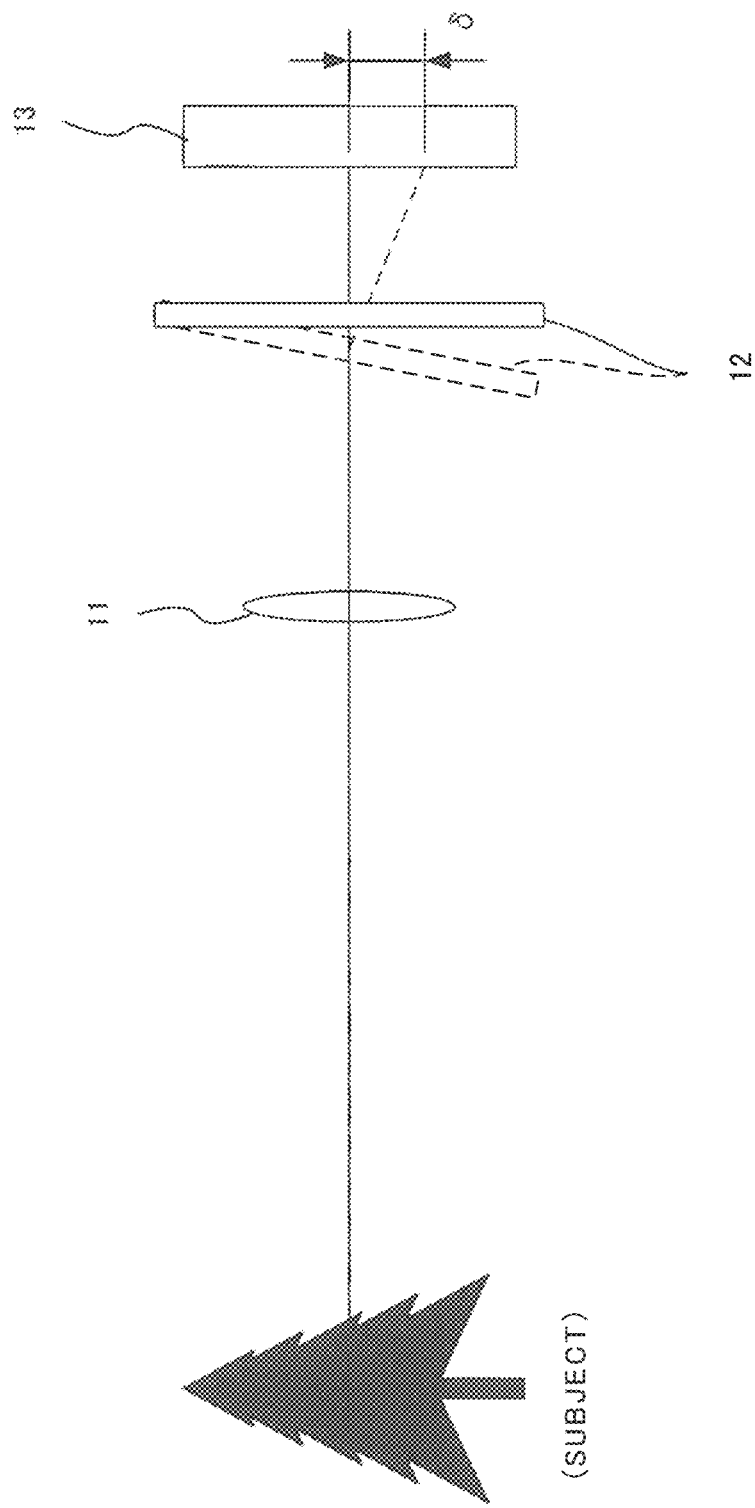
FIG. 2 is a diagram illustrating an operation of an optical path changing unit.

FIG. 2 is a diagram illustrating an operation of the optical path changing unit 12. The optical path changing unit 12 operates in accordance with an optical path change instruction output from the noise eliminating block 20 when the noise eliminating block 20 determines that a subject does not change a state thereof. Therefore, the optical path changing unit 12 does not operate when a subject changes a state thereof.

The optical path changing unit 12 is formed of a material such as germanium, chalcogenide, sapphire, plastic, and glass, and refracts infrared rays. Thus, an optical path of infrared rays incident on an infrared sensor 13 is changed. In FIG. 2, a displacement δ represents a displacement of an incident point of infrared rays refracted by the optical path changing unit 12.

When receiving an optical path change instruction from the noise eliminating block 20, the optical path changing unit 12 tilts at an angle corresponding to the optical path change instruction. As will be described below, an optical path change instruction means, when it is determined that a subject does not change a state thereof, tilting the optical path changing unit 12 to change an incident point of infrared rays incident on the infrared sensor 13. In other words, even when a subject does not change a state thereof, tilting of the optical path changing unit 12 causes a position of infrared rays incident on the infrared sensor 13 to shift as if a captured image changes a state thereof.

Such a captured image obtained as a result of tilting of the optical path changing unit 12 is described as a pseudo captured image and corresponding state change is described as a pseudo state change. In FIG. 2, a captured image (pseudo captured image) that undergoes a state change (pseudo state change) corresponding to a displacement δ is obtained.

Figure 3:
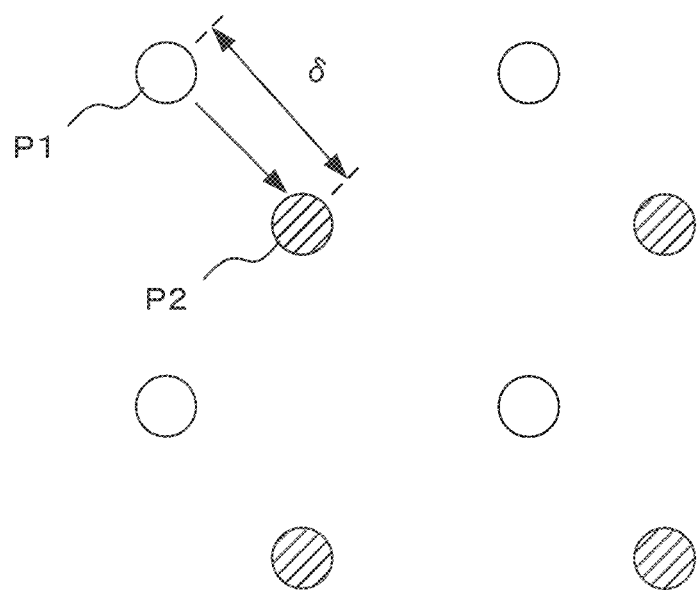
FIG. 3 is a diagram illustrating a pseudo state change.

FIG. 3 is a diagram illustrating a pseudo state change. A point of a subject is captured by a pixel P1 represented by an open circle, and then, the point is captured by a pixel P2 represented by a shaded circle as a result of tilting of the optical path changing unit 12. A distance between the pixel P1 and the pixel P2 represents a displacement δ.

The infrared sensor 13 is formed of a plurality of pixels, and each pixel converts infrared rays incident on the pixel into an electrical signal and outputs the signal. Although each pixel is manufactured at a time, a different type of noise is generated in each pixel depending on uniformity of material and processing, temperature distribution when the sensor is used, and the like. Accordingly, a noise signal generated in each pixel is superimposed on an image capture signal output from the infrared sensor 13.

Figure 4:
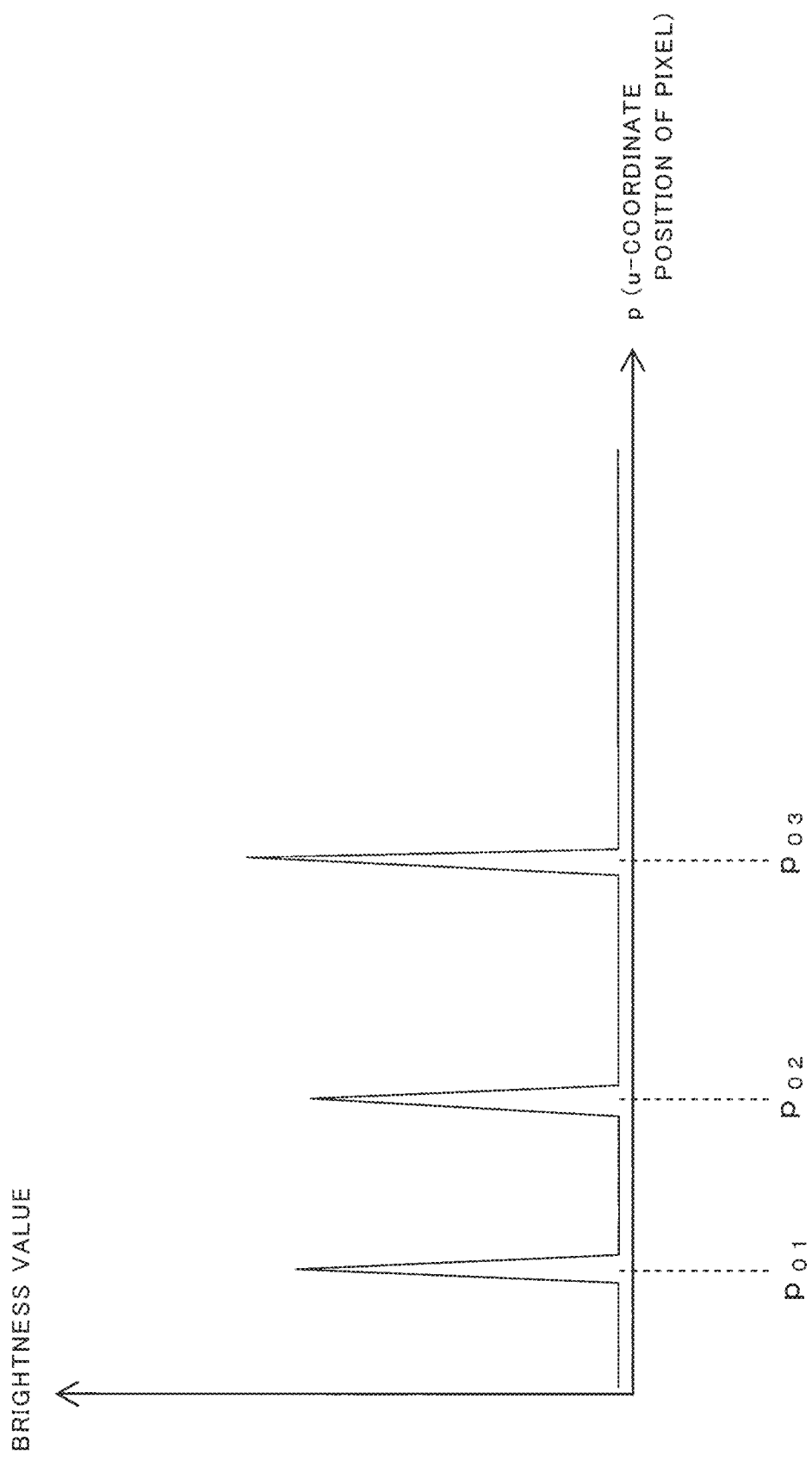
FIG. 4 is a diagram illustrating brightness distribution of a signal corresponding to noise output from pixels.

FIG. 4 is a diagram illustrating brightness distribution of signals output from respective pixels when an image of a dark field (experimentally realized, for example, with a shutter closed) is captured by an infrared sensor. As can be seen from FIG. 4, brightness distribution of pixels at positions $p_{01}$, $p_{02}$, and $p_{03}$ changes sharply.

Figure 5:
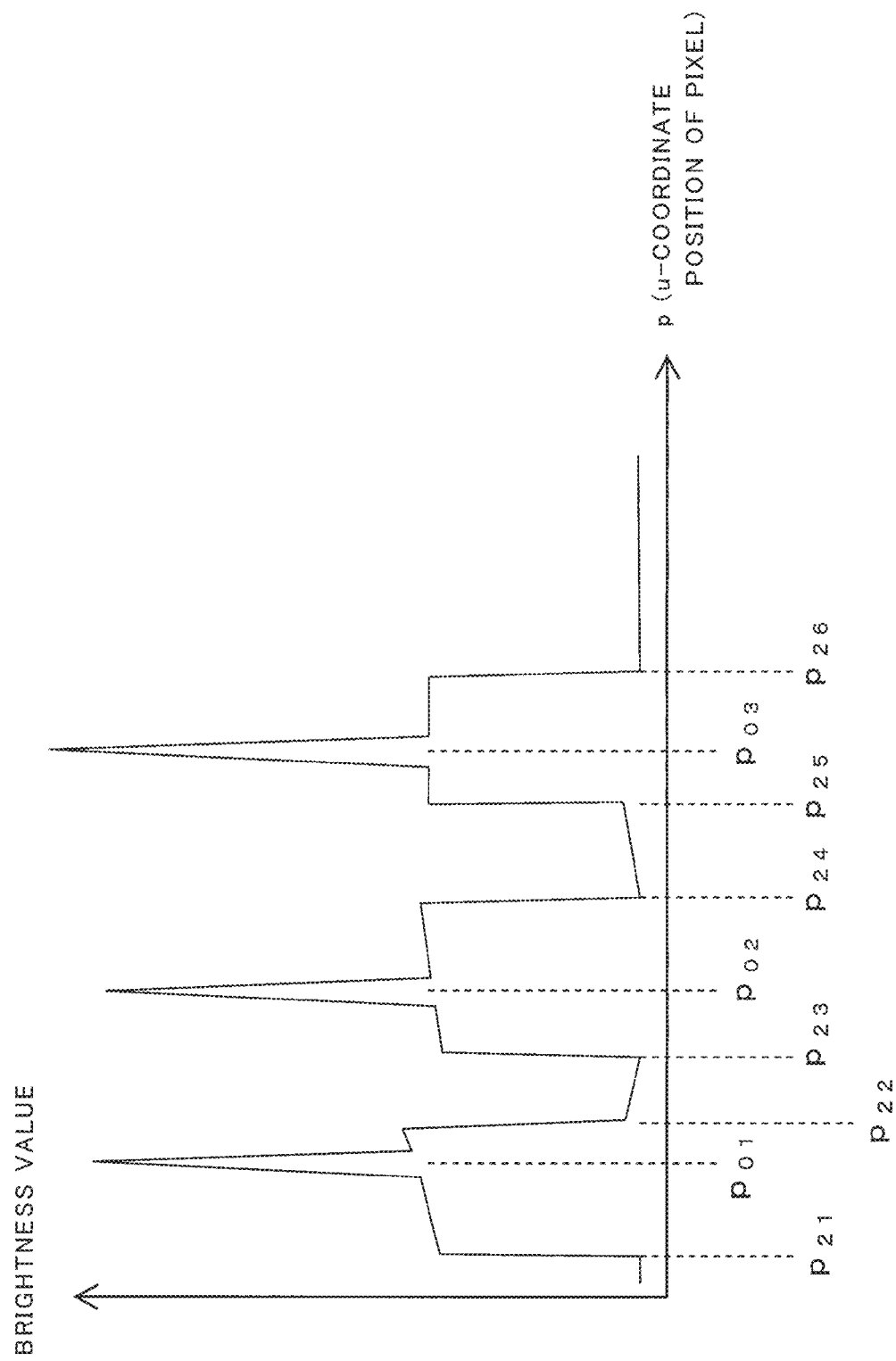
FIG. 5 is a diagram illustrating brightness distribution of an image capture signal when an image of a subject is captured.
Figure 6:
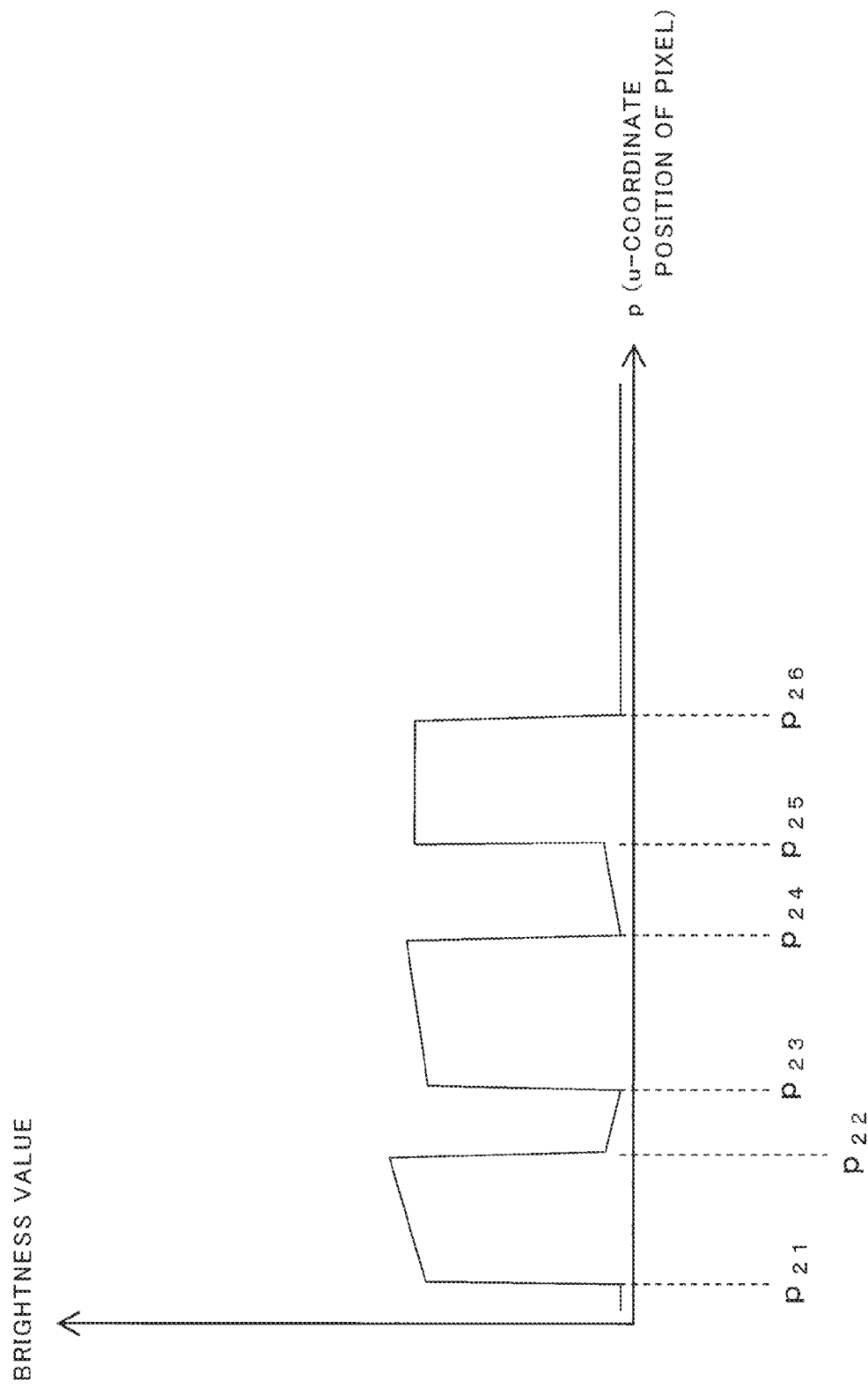
FIG. 6 is a diagram illustrating brightness distribution of a true subject image of a subject.

FIG. 5 is a diagram illustrating brightness distribution when an image of a subject (hereinafter described as subject A) is captured by use of the infrared sensor. In FIG. 5, brightness values of signals from pixels at respective positions ($p_{01}$, $p_{02}$, and $p_{03}$, and $p_{21}$, $p_{22}$, $p_{23}$, $p_{24}$, $p_{25}$, and $p_{26}$) change sharply. It should be noted that the brightness distribution illustrated in FIG. 4 (brightness values of pixels at positions $p_{01}$, $p_{02}$, and $p_{03}$) is included. Consequently, brightness distribution of a true subject image can be considered as distribution illustrated in FIG. 6, obtained by subtracting the brightness distribution in FIG. 4 from the brightness distribution in FIG. 5.

Figure 7:
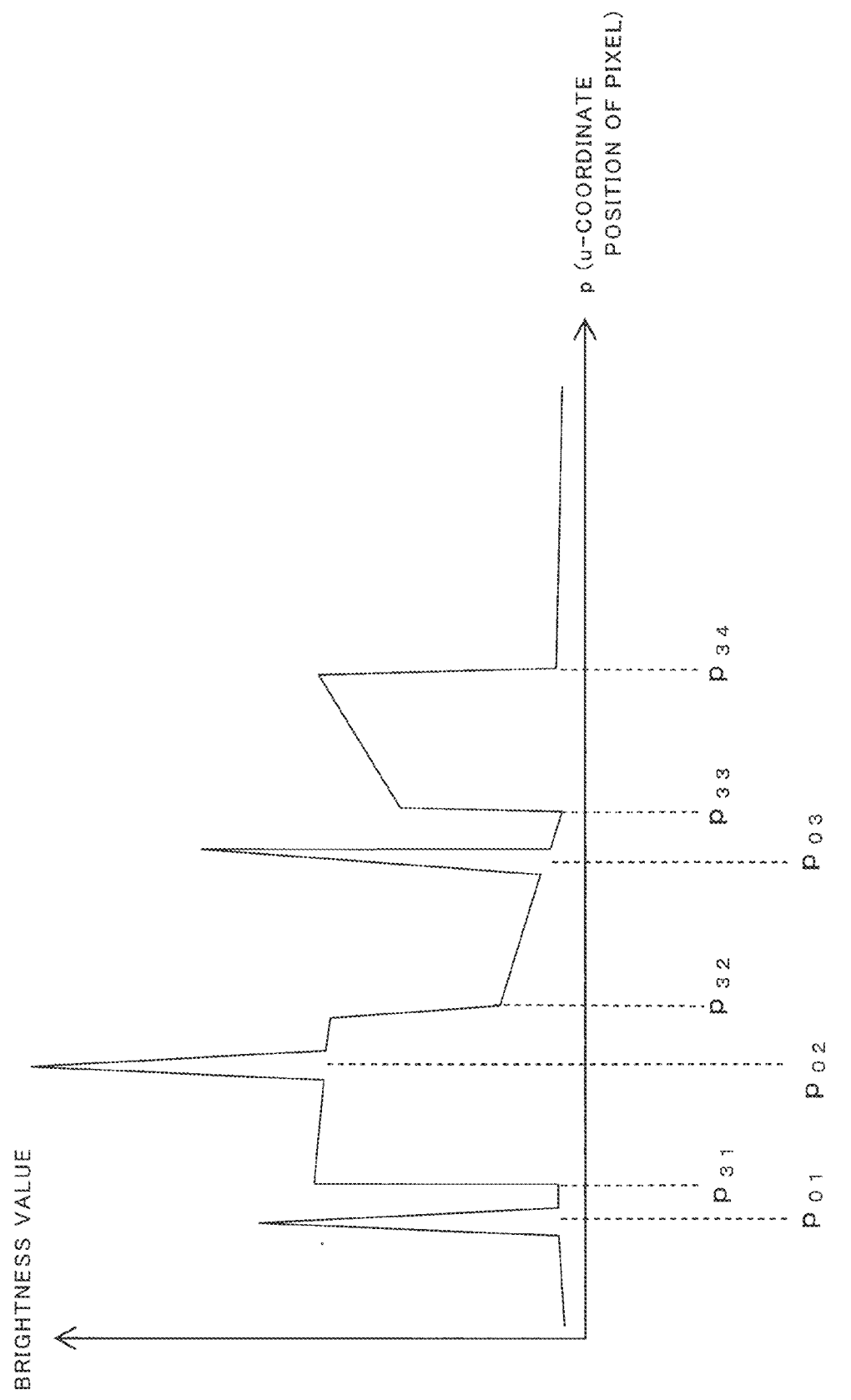
FIG. 7 is a diagram illustrating brightness distribution of an image capture signal when an image of another subject is captured.
Figure 8:
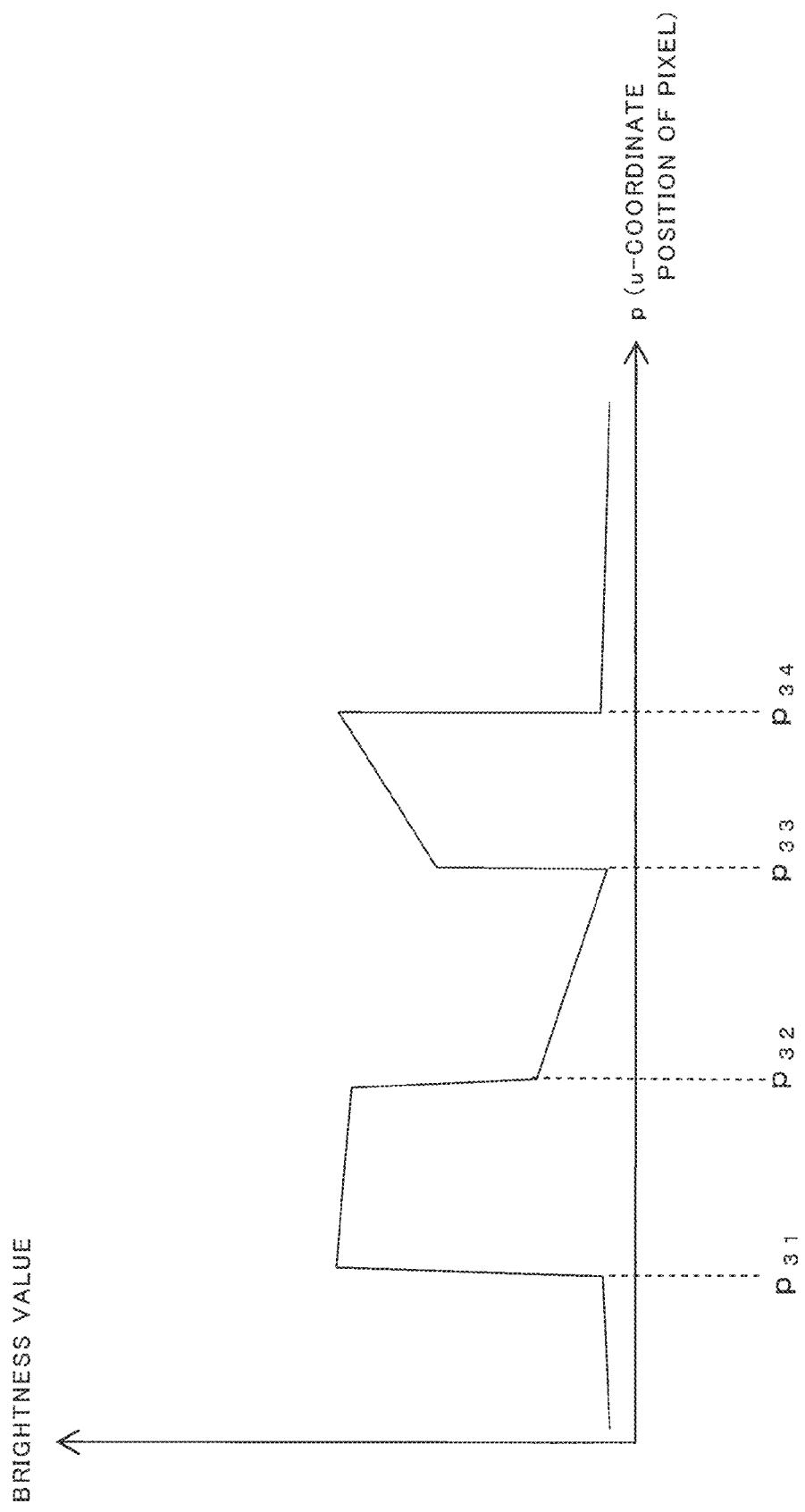
FIG. 8 is a diagram illustrating brightness distribution of a true subject image of another subject.

FIG. 7 is a diagram illustrating brightness distribution of respective pixels (pixels at positions $p_{01}$, $p_{02}$, and $p_{03}$, and $p_{31}$, $p_{32}$, $p_{33}$, and $p_{34}$) when an image of a subject B, different from the subject A, is captured by use of the same infrared sensor. It can be seen from FIG. 7 that brightness distribution of respective pixels capturing an image of the subject B includes the brightness distribution illustrated in FIG. 4. Consequently, brightness distribution of a true subject image can be considered as distribution illustrated in FIG. 8, obtained by subtracting the brightness distribution in FIG. 4 from the brightness distribution in FIG. 7.

Therefore, it can be concluded that the brightness distribution illustrated in FIG. 4 represents brightness values of a signal that exists independent of a subject, and the signal represents noise generated in pixels. Since brightness values of noise change sharply, frequency of the noise can be considered as high frequency. Since it is difficult to directly obtain noise from an image capture signal, noise (offset) is obtained as a correction value to correct a captured image by performing an aligning SBN correction value calculating process or a statistical SBN correction value calculating process in the noise eliminating block 20 to be described below.

The amplifier circuit 14 amplifies an image capture signal being an analog signal from the infrared sensor 13, and the AD converting circuit 15 converts the amplified image capture signal into a digital signal.

Figure 9:
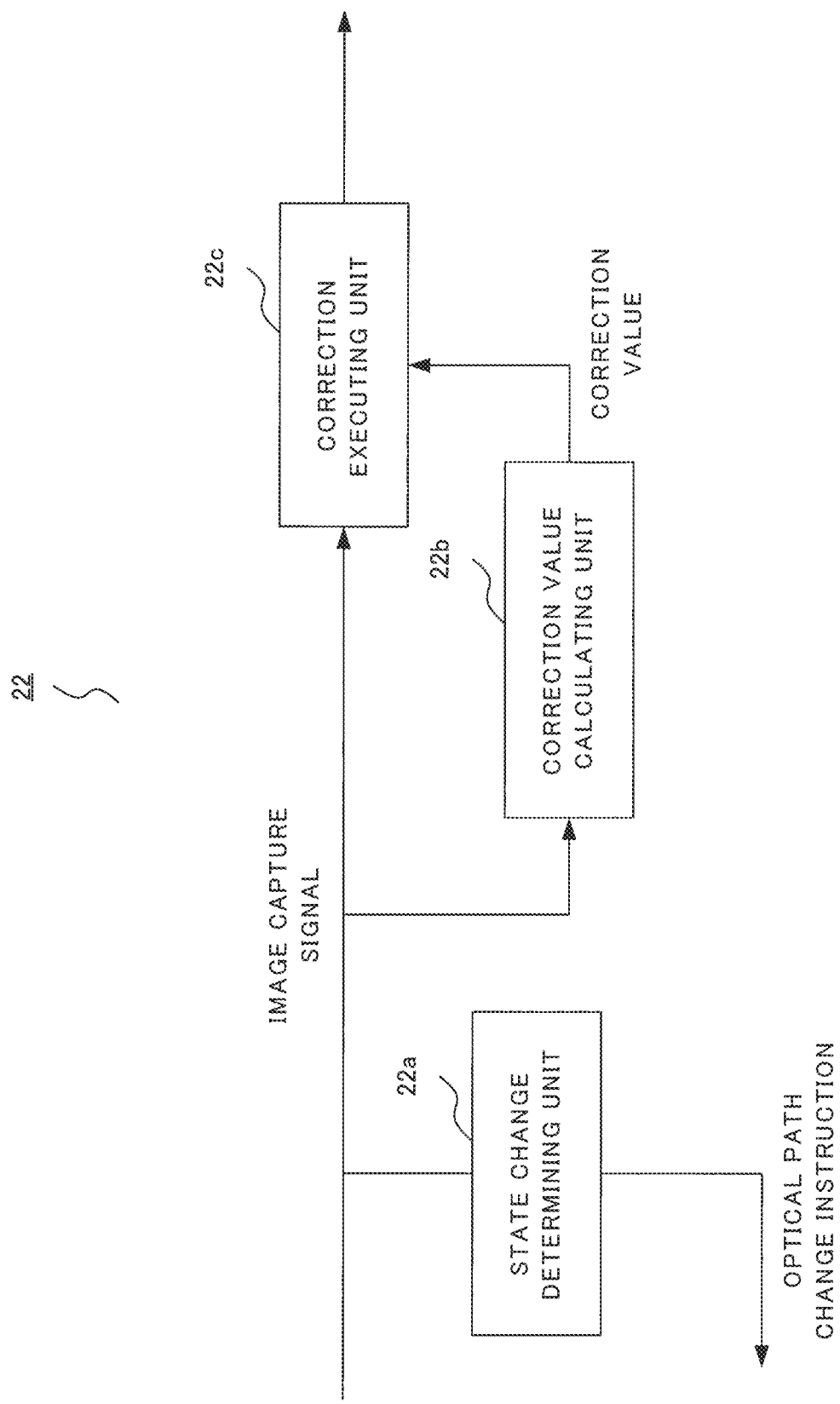
FIG. 9 is a block diagram of a noise eliminating unit.

The noise eliminating block 20 includes an image buffer 21 that primarily stores an image capture signal from the image capturing block 10, and a noise eliminating unit 22 that performs the aligning SBN correction value calculating process when a subject does not change a state thereof and performs the statistical SBN correction value calculating process when a subject changes a state thereof. The noise eliminating unit 22 includes a state change determining unit 22a, a correction value calculating unit 22b, and a correction executing unit 22c as illustrated in FIG. 9.

The state change determining unit 22a calculates a standard deviation of a brightness value of an image capture signal per pixel and performs a state change determining process to determine a state change of a subject based on the standard deviation. A determination result of the state change is output to the optical path changing unit 12 as an optical path change instruction.

The correction value calculating unit 22b calculates an offset as a correction value. An image based on an offset is hereinafter described as an offset image.

The correction executing unit 22c generates a true subject image from which noise is eliminated by subtraction or the like of an offset image from a captured image, by use of the correction value calculated by the correction value calculating unit 22b.

Figure 10:
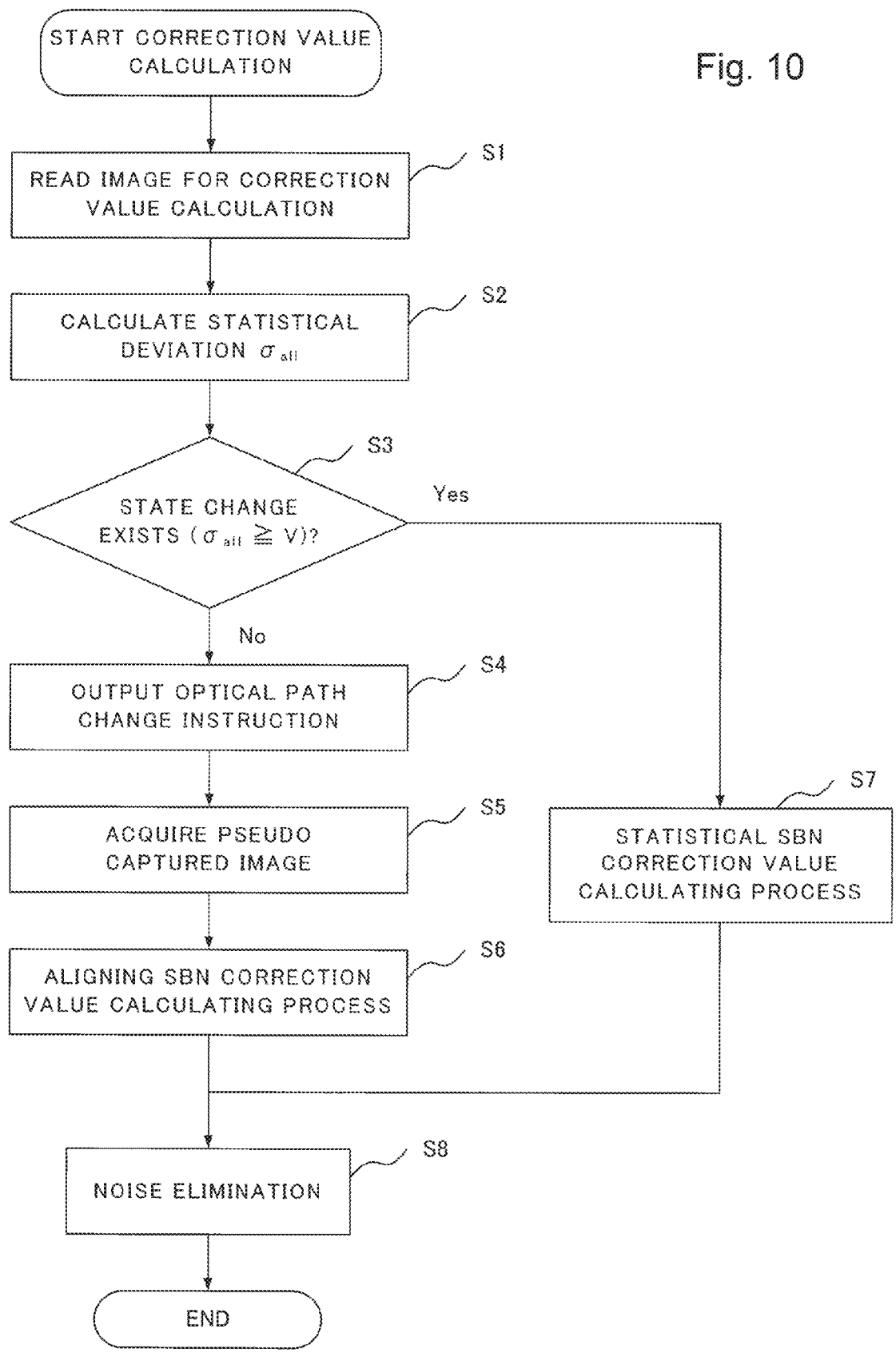
FIG. 10 is a flowchart illustrating procedures performed in a noise eliminating unit.

Next, the aligning SBN correction value calculating process (mainly Steps S4 to S6) and the statistical SBN correction value calculating process (mainly Step S7) in the noise eliminating unit 22 will be described with reference to a flowchart illustrated in FIG. 10. In the aligning SBN correction value calculating process, the number of frames of a captured image used for calculating a correction value is denoted as N and a threshold value used for determining a state change is denoted as V, both values being predetermined based on an experimental result.

Step S1: First, the state change determining unit 22a reads a captured image stored in the image buffer 21 as an image for calculating a correction value. A captured image with the number of frames N is read, and therefore N images for calculating a correction value are read. The number of frames N is a number greater than or equal to 1. While correction effect (noise elimination accuracy) improves as the number of frames N becomes greater, operational load for calculating a correction value increases when the number of frames is set to an excessively large number. Therefore, the number of frames N is set by determining balance between such correction effect and operational load.

Step S2: The state change determining unit 22a calculates a standard deviation $\sigma_{(n, m)}$ corresponding to each pixel of an image for calculating a correction value. The standard deviation $\sigma_{(n, m)}$ herein represents a standard deviation of a brightness value of an image capture signal output from an n-by-m array of pixels with respect to the time axis.

Figure 11:
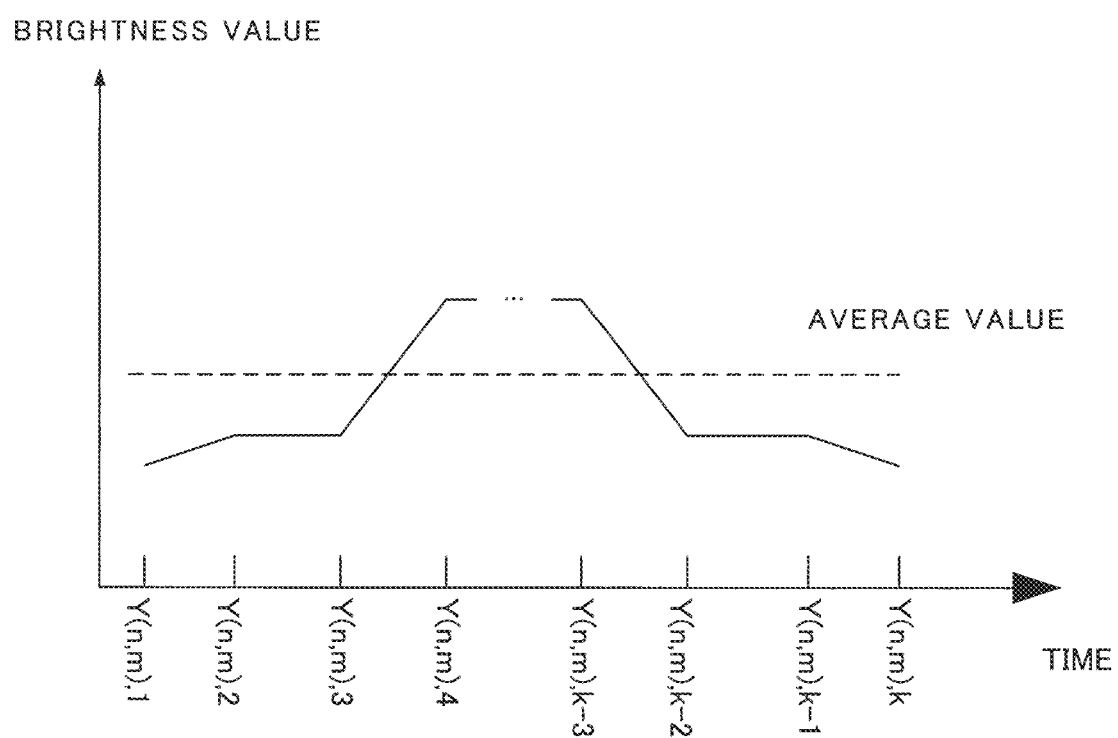
FIG. 11 is a diagram illustrating time-series brightness values of a pixel.

FIG. 11 is a diagram illustrating a brightness value of each pixel in each frame in a time-series manner. The time reflects a state change of a subject. $Y_{(n, m), k}$ represents a brightness value of a pixel in a row n and a column m of a captured image in a frame k. The correction value calculating unit 22b calculates a standard deviation $\sigma_{(n, m)}$ of the aforementioned brightness value for each frame.

Then, the state change determining unit 22a obtains a sum of standard deviations $\sigma_{(n, m)}$ of all pixels ($\sigma_{all} = \Sigma \sigma_{(n, m)}$). A statistical deviation $\sigma$all is not necessarily a "sum" of standard deviations of all pixels but may be an "average".

A standard deviation $\sigma_{(n, m)}$ is a statistical deviation of one pixel with respect to a time change (state change of a subject). Therefore, a statistical deviation $\sigma_{all}$ becomes "0" when a subject does not change a state thereof, and a statistical deviation $\sigma_{all}$ does not become "0" when a subject changes a state thereof. Further, even when a subject does not change a state thereof, a statistical deviation $\sigma_{all}$ does not precisely become "0" when noise exists in a pixel.

Step S3: Therefore, the state change determining unit 22a determines a state change of a subject by comparing a statistical deviation $\sigma_{all}$ with a threshold value V. As described above, even when a subject does not change a state thereof, a statistical deviation $\sigma_{all}$ does not precisely become "0" due to noise in a pixel. Thus, a state change of a subject can be determined regardless of whether or not noise exists by setting a threshold value V to accommodate a noise level.

When a comparison result between a statistical deviation $\sigma_{all}$ and a threshold value V indicates that the statistical deviation $\sigma_{all}$<the threshold value V, it is determined that a subject does not change a state thereof, and the flow proceeds to Step S4 and the aligning SBN correction value calculating process is performed. On the other hand, when the statistical deviation $\sigma_{all} \geq$ the threshold value V, it is determined that a subject changes a state thereof, and the flow proceeds to Step S7 and the statistical SBN correction value calculating process is performed.

Steps S4 and S5: When a subject does not have a state change, the state change determining unit 22a outputs an optical path change instruction to the optical path changing unit 12. Consequently, the optical path changing unit 12 tilts, refracts infrared rays incident on the infrared sensor 13, and generates a pseudo state change.

Step S6: Next, the correction value calculating unit 22b performs the aligning SBN correction value calculating process for calculating a correction value. In general, when $X_k$ and b respectively represent a true subject image and an offset image, a captured image $Y_k$ of the frame number k can be expressed as:

$$Y_k = X_k + b \qquad (1)$$

where $X_k$, $Y_k$, and b are vector quantities. The offset image b represents fixed-pattern noise inherent to each pixel and is therefore independent of the frame number k.

Further, a following equation between a pseudo captured image $Y_1$ of the frame number 1 and a pseudo captured image $Y_k$ of the frame number k holds:

$$Y_k = M_k Y_1 \qquad (2)$$

where $M_k$ represents a transformation matrix that relates different pseudo captured images and is determined by characteristics of the optical path changing unit 12 (displacement δ).

From equations (1) and (2), an average energy of high-frequency components (target energy) E contained in a pseudo captured image can be expressed as:

$$E = \sum_{k=1}^{D} \|X_k + b - Y_k\|^2 + \alpha\|L \cdot X_k\|^2 \quad (3)$$

$$E = \sum_{k=1}^{D} \|M_k X_k + b - Y_k\|^2 + \alpha\|L \cdot X_k\|^2 \quad (4)$$

where L is a Laplacian filter matrix (high-pass filter) and α is a weight to be set to an arbitrary value. L is not limited to a Laplacian filter matrix and can be substituted by any filter that can be used for detecting a boundary (edge) of a domain, such as a Sobel filter.

In the present exemplary embodiment, it is assumed that "a displacement δ of an image by the optical path changing unit 12 is constant for all pixels" and an offset image b that minimizes the target energy E in equation (4) is calculated as a correction value. Specifically, in equation (4), when an offset image b is varied with respect to a true subject image $X_1$, an offset image b that minimizes the target energy E is obtained.

Step S7: On the other hand, in Step S3, when the statistical deviation $\sigma_{all} \geq$ the threshold value V and it is determined that a subject has a state change, the statistical SBN correction value calculating process is performed. In this case, an optical path change instruction is not output since a pseudo state change does not need to be generated.

Previously, a captured image $Y_k$ of the frame number k, where $X_k$ and b respectively represent a true subject image and an offset image, has been defined in equation (1).

Further, in the aligning SBN correction value calculating process, target energy E has been defined in equation (3) or equation (4). However, in the statistical SBN correction value calculating process, target energy E is defined in equation (5) below.

$$E = \frac{1}{D}\sum_{k=1}^{D} \|L(Y_k - b)\|^2 \quad (5)$$

"$\|L(Y_k-b)\|^2$" represents an "L2 norm of $L(Y_k-b)$".

The correction value calculating unit 22b calculates an offset b that minimizes the target energy E expressed in equation (5) as a correction value, being an offset that exists in common over D image capture signals $Y_k$. As for a calculation method, any method such as a direct method (Gaussian elimination, LU decomposition, and the like), an iterative method (a conjugate gradient method and the like), and deconvolution in the frequency domain, may be used.

Step S8: The correction executing unit 22c obtains a true subject image by subtraction or the like of an offset image from a captured image by use of a correction value obtained by the correction value calculating unit 22b.

Figure 12:
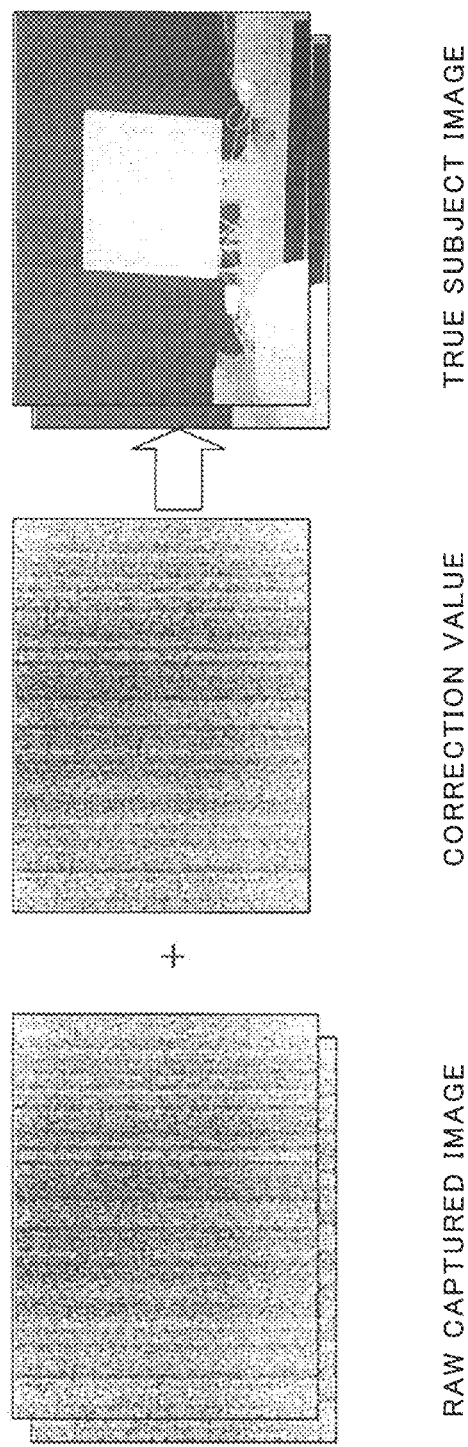
FIG. 12 is a diagram exemplifying a true subject image obtained by subtracting a correction value from a captured image of a subject without a state change.
Figure 13:
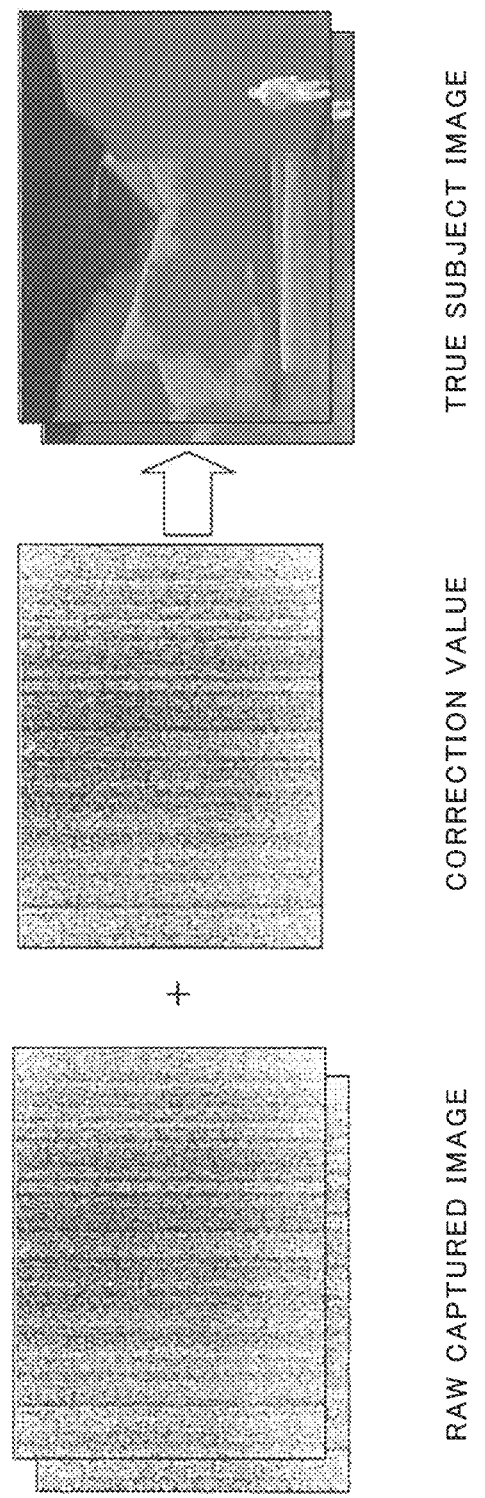
FIG. 13 is a diagram exemplifying a true subject image obtained by subtracting a correction value from a captured image of a subject with a state change.

FIG. 12 is a diagram exemplifying a true subject image obtained by subtracting a correction value (offset image) from a captured image of a subject that does not change a state thereof, such as a signboard, through the processes in Steps S4 to S6. On the other hand, FIG. 13 is a diagram exemplifying a true subject image obtained by subtracting a correction value from a captured image of a subject that changes a state thereof, such as a pedestrian, through the process in Step S7.

As described above, noise elimination can be performed without requiring a shutter and regardless of whether or not a subject changes a state thereof, so that a high-quality image can be obtained. Further, there is another advantage that an image capture device can be downsized since a shutter is not required.

The aforementioned image correction method can also be programmed and recorded on a computer-readable recording medium.

While the present invention has been described above with reference to the exemplary embodiment (and the examples), the present invention is not limited to the aforementioned exemplary embodiment (and the examples). Various changes and modifications which can be understood by those skilled in the art may be made to the configurations and details of the present invention, within the scope of the present invention.

This application claims priority based on Japanese Patent Application No. 2013-090532 filed on Apr. 23, 2013, the disclosure of which is hereby incorporated by reference thereto in its entirety.

REFERENCE SIGNS LIST

2 Image capture device
10 Image capturing block
11 Lens
12 Optical path changing unit
13 Infrared sensor (Image capture element)
14 Amplifier circuit
20 Noise eliminating block
21 Image buffer
22 Noise eliminating unit
22a State change determining unit
22b Correction value calculating unit
22c Correction executing unit

The invention claimed is:

1. An image capture device configured to capture an image of a subject and output an image capture signal, the image capture device comprising:

an image capture element comprising a plurality of pixels and being configured to acquire a captured image by detecting light from the subject and converting the light into an electrical signal;

an optical path changing unit configured to change an optical path of light incident on the image capture element and displace a position of light incident on the image capture element; and at least one processor configured to execute machine-readable instructions to implement:

a state change determining unit configured to determine whether or not the subject temporally changes a state thereof based on a deviation of a brightness value in the captured image and, when it is determined that the subject does not change a state thereof, to output an optical path change instruction to the optical path changing unit to change an optical path of light incident on the image capture element;

a correction value calculating unit configured to calculate a correction value for performing a noise elimination process corresponding to a state change of the subject using at least one of the captured image captured when the subject changes the state thereof, and the captured image obtained by changing an optical path of light from the subject not changing the state thereof in accordance with the optical path change instruction; and a correction executing unit configured to eliminate noise from the captured image by use of the correction value.

2. The image capture device according to claim 1, wherein, the state change determining unit is configured to calculate a the deviation by statistical processing of a standard deviation obtained for each pixel over a plurality of captured images, and to determine that the subject changes the state thereof when the deviation is greater than a predetermined threshold value, and to determine that the subject does not change the state thereof when the deviation is smaller than the threshold value.

3. The image capture device according to claim 1, wherein, the optical path changing unit, when receiving the optical path change instruction, is configured to tilt at an angle corresponding to the optical path change instruction.

4. An image correction method for eliminating noise from a captured image of a subject, the image correction method comprising:

causing an image capture element comprising a plurality of pixels to acquire a captured image by detecting light from the subject and converting the light into an electrical signal;

changing an optical path of light incident on the image capture element and displacing a position of light incident on the image capture element;

determining, using at least one processor, whether or not the subject temporally changes a state thereof based on a deviation of a brightness value in the captured image, and outputting an optical path change instruction to change an optical path of light incident on the image capture element when it is determined that the subject does not change the state thereof;

calculating, using the at least one processor, a correction value for performing a noise elimination process corresponding to a state change of the subject using at least one of the captured image captured when the subject changes the state thereof, and the captured image obtained by changing an optical path of light from the subject not changing the state thereof in accordance with the optical path change instruction; and eliminating, using the at least one processor, noise from the captured image by use of the correction value.

5. The image correction method according to claim 4, further comprising calculating the deviation by statistical processing of a standard deviation obtained for each pixel over a plurality of captured images, determining that the subject changes the state thereof when the deviation is greater than a predetermined threshold value, and determining that the subject does not change the state thereof when the deviation is smaller than the threshold value.

6. The image correction method according to claim 4, further comprising changing an optical path of light incident on the image capture element at an angle corresponding to the optical path change instruction.

7. A tangible, non-transitory, computer-readable storage medium comprising stored executable instructions that, when executed by a processor, cause the processor to perform a method for performing image correction to eliminate noise from a captured image of a subject, the method comprising:

causing an image capture element comprising a plurality of pixels to acquire a captured image by detecting light from the subject and converting the light into an electrical signal;

changing an optical path of light incident on the image capture element and displacing a position of light incident on the image capture element;

determining whether or not the subject temporally changes a state thereof based on a deviation of a brightness value in the captured image, and outputting an optical path change instruction to an optical path changing unit to change an optical path of light incident on the image capture element when it is determined that the subject does not change the state thereof;

calculating a correction value for performing a noise elimination process corresponding to a state change of the subject by one of the captured image captured when the subject changes the state thereof, and the captured image obtained by changing an optical path of light from the subject not changing the state thereof in accordance with the optical path change instruction; and eliminating noise from the captured image by use of the correction value.

8. The image correction program according to claim claim 7, wherein, the determining step further comprises calculating the deviation by statistical processing of a standard deviation obtained for each pixel over a plurality of captured images, determining that the subject changes the state thereof when the statistical deviation is greater than a predetermined threshold value, and determining that the subject does not change the state thereof when the deviation is smaller than the threshold value.

9. The image correction program according to claim 7, wherein, changing the optical path of light comprises changing the optical path of light incident on the image capture element at an angle corresponding to the optical path change instruction.

10. An image capture device configured to capture an image of a subject and output an image capture signal, the image capture device comprising:

an image capture element comprising a plurality of pixels, and being configured to detect light from the subject, and convert the light into an electrical signal;

an acquiring unit configured to acquire a captured image based on the electrical signal;

an optical path changing unit configured to change an optical path of light incident on the image capture element and to displace a position of light incident on the image capture element; and at least one processor configured to execute computer-executable instructions to function as:

a brightness value deviation acquiring unit configured to acquire a deviation of a brightness value in the captured image;

a state change determining unit configured to change an optical path of light incident on the image capture element when the acquired deviation is smaller than a predetermined value;

a correction value calculating unit configured to calculate a correction value for performing a noise elimination process corresponding to a state change of the subject by use of one of the captured image captured when the acquired deviation is greater than or equal to a predetermined value, and the captured image obtained by changing an optical path of light by the state change determining unit; and a correction executing unit configured to eliminate noise from the captured image by use of the correction value.

* * * * *